United States Patent [19]

Nishita et al.

[11] Patent Number: 5,052,022
[45] Date of Patent: Sep. 24, 1991

[54] REPEATER AND PLL CIRCUIT

[75] Inventors: Shigeo Nishita, Kokubunji; Ryozo Yoshino; Masato Hirai, both of Hadano, all of Japan

[73] Assignee: Hitachi, Ltd., Tokyo, Japan

[21] Appl. No.: 378,281

[22] Filed: Jul. 11, 1989

[30] Foreign Application Priority Data

Jul. 15, 1988 [JP]  Japan ................................. 63-175091

[51] Int. Cl.⁵ ............................................. H04L 25/52
[52] U.S. Cl. ............................................ 375/4; 331/17; 375/120
[58] Field of Search ............... 375/3, 4, 12, 120, 118; 329/307, 308, 316, 325; 328/164; 331/1 R, 10, 16, 17

[56]  References Cited
U.S. PATENT DOCUMENTS

| 4,078,157 | 3/1978 | Lender et al. | 375/4 |
| 4,215,251 | 7/1980 | Fukuda et al. | 375/4 |
| 4,523,157 | 6/1985 | Sato | 331/17 |
| 4,667,170 | 5/1987 | Lofgren et al. | 331/17 |
| 4,733,404 | 3/1988 | Ostoich | 375/4 |
| 4,749,961 | 6/1988 | Kato et al. | 331/17 |
| 4,818,950 | 4/1989 | Ranger | 331/17 |

OTHER PUBLICATIONS

IBM Journal of Research Development, vol. 29, No. 6, Nov. 1985, pp. 580-587.

Primary Examiner—Benedict V. Safourek
Attorney, Agent, or Firm—Antonelli, Terry, Stout & Kraus

[57]  ABSTRACT

A PLL circuit for generating an AC output signal synchronized with an AC input signal applied thereto with a phase offset with respect to the input signal includes, in one embodiment, a charge pump circuit capable of varying the phase offset depending on the frequency of the AC input signal. In a signal transmission network system including a plurality of nodes coupled to a signal transmission line and distanced from one another by various repeat lengths of transmission path, each node has a repeater including such PLL circuit to suppress jitter caused by individual repeat length of transmission over the transmission line and still remaining in an equalized AC signal in each node.

15 Claims, 16 Drawing Sheets

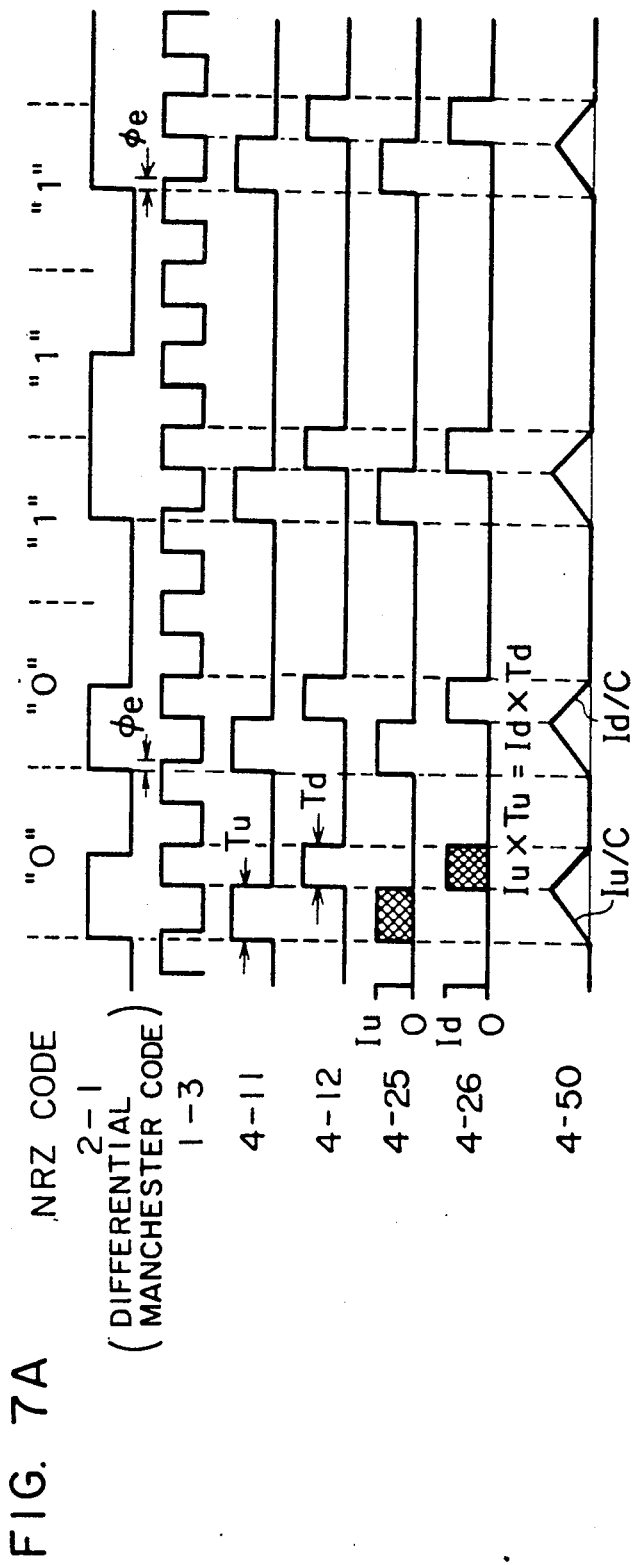

REPEATER AND PLL CIRCUIT

BACKGROUND OF THE INVENTION

The present invention relates to repeaters which have main functions of waveform equalization to compensate distortion of a digital signal caused during its propagation in a transmission line, reproduction of the digital signal and extraction of a timing signal for use in the reproduction of the digital signal.

Generally, a signal transmission network system such as represented by the token ring LAN (Local Area Network) includes a signal transmission line and a plurality of nodes connected to the transmission line. Each node equalizes/reproduces a signal received from an upstream neighbouring node and sends it via the transmission line to a downstream neighboring node. When the signal is transmitted from one node to a downstream neighboring node, it propagates over a length or distance of transmission line between the two nodes, i.e., a repeat length of transmission path.

Conventionally, the repeater of each node is provided with an equalizer which has, however, fixed equalization characteristics. Meanwhile, when a signal is a pulse signal, such as the differential Manchester code signal, for example, problems of jitter (phase step) will arise whenever the signal takes a long period repetitive pattern in which a burst of "0" bits or a burst of "1" bits (all-zero bit pattern or all-one bit pattern) is followed by a burst of "1" bits or a burst of "0" bits (all-one bit pattern or all-zero bit pattern). Namely, a transmission line generally has a response depending on the frequency of a transmission signal such that loss increases as the frequency increases for the same transmission distance, with the loss increasing as the distance increases (See FIG. 5). In the differential Manchester code mentioned above, the frequency for "0" is twice that for "1", and therefore, a transmitted pulse waveform of a "0" burst deviates in phase (in the zero-cross point where the waveform rises) from a transmitted pulse waveform of a "1" burst. This deviation is called jitter (pattern jitter). In this specification, a pulse code signal having a first frequency for a binary value "0" or "1" and a second frequency different from the first frequency for a binary value "1" or "0" as in the differential Manchester code is referred to as "a two-frequency code signal", and, generally, "a multi-frequency code signal". Assuming that an amount of jitter is defined as a deviation (lead or lag) of the time of rise for zero-crossing of a waveform of an all-one pattern ("1" burst) as measured from the time of rise for zero-crossing of a waveform of an all-zero pattern and that an amount of jitter per one repeating (repeater) is represented by $\phi$ (seconds), an amount of jitter $\phi_N$ (seconds) contained in a signal having passed through N repeaters will be given by the following equation.

$$\phi_N = \phi \left\{ 4\sqrt{N} + N + \left(\frac{N}{2\xi}\right)^2 \right\} \quad (1)$$

where N is the number of repeaters, $\xi$ is the damping factor of a Phase-Locked Loop (PLL) circuit which is provided in the repeater for extracting timing signals as discussed in "JITTER-ACCOMODATING IN TOKEN-PASSING RING LANS", IBM J. RES. DEVELOP. Vol. 29, No. 6, November, 1985, pp. 580–586. In order to prevent occurrence of a signal reception error (the state in which received data cannot be taken in with a clock due to jitter) in the signal transmission system generated due to an accumulated jitter $\phi_N$ as represented by equation (1), an elastic buffer (the buffer size is $\pm E$ bits) is provided in the repeater of one of the nodes which acts as a master station (an active monitor station) in the system to ensure reception of data having jitter within a predetermined range. In this case, assuming that the transmission rate is represented by Mbps (T=1/M), the following equation must be satisfied $$E \times T \geqq \phi_N = \phi \left\{ 4\sqrt{N} + N + \left(\frac{N}{2\xi}\right)^2 \right\} \quad (2)$$

The value for E may be 3, for example, so that with M=4 Mbps $\phi_N \geqq 3 \times 250 = 750$ ns.

With the prior art system, the jitter amount contained in a signal sent from the repeater of a node varies depending on the transfer function H(f) of an equalizer provided in the repeater, as shown in FIG. 1, which illustrates a relation between the jitter amount $\phi$ contained in the signal sent to the transmission line from a repeater and the transmission length, i.e., the repeat length of transmission path. In FIG. 1 type a represents a jitter amount of a signal sent from a repeater having an equalizer designed to cover relatively small transmission lengths, while type b represents that from a repeater having an equalizer designed to cover relatively large transmission lengths. The equalizers provided in the repeaters exhibiting type a and type b responses have transfer functions H(f) as represented by the following equation in which the characteristic is such as to oppose the above-mentioned line characteristic (approximately a U-shaped characteristics, not shown):

$$H(f) = \frac{\left(1 + j\frac{f}{f_{3i}}\right)}{\left(1 + j\frac{f}{f_{1i}}\right)\left(1 + j\frac{f}{f_{2i}}\right)} \quad (i = a, b) \quad (3)$$

where $f_{3i}$, $f_{1i}$ and $f_{2i}$ represent the rise initiation time, the rise termination time and fall initiation time in the U-shaped characteristic of the equalizer with a relation $f_{3i} < f_{1i} < f_{2i}$.

The $f_{1i} - f_{3i}$ of the type a deviate slightly toward a higher frequency than toward the $f_{1i} - f_{3i}$ of the type b.

In FIG. 1, the type a repeater performs substantially complete equalization for a line length at the most preferable equalization point $a_1$ (such that the amount of jitter after equalization is 0), but equalization cannot be performed properly for a different line length and hence jitter remains. Similarly, for the type b repeater, jitter cannot be eliminated sufficiently for a line length at a point other than the most preferable equalization point $b_1$. A region where $\phi < 0$ and the zero-cross point in an all-one pattern leads the zero-cross point in an all-zero pattern is called an over-equalization region, and a region where $\phi > 0$ and the zero-cross point in an all-one pattern lags the zero-cross point in an all-zero pattern is called an insufficient equalization region. The point where $\phi = 0$ and the zero-cross points in both the patterns coincide is the matched-filtered point or the most preferable equalization point.

FIG. 1 will now be analyzed from a standpoint of waveform equalization. FIGS. 2A and 2B show waveform equalizing characteristics (eye patterns) of fixed equalizers. FIG. 2A shows the characteristic for a transmission line having a length shorter than the most preferable equalization point length and FIG. 2B for a transmission line having a length larger than the most preferable equalization point length. The period of the all "1" pattern is twice that of the all "0" pattern. In the same Figure, forward- and reverse-phase waveforms are written together. As shown in FIGS. 2A. and 2B, in the case of jitter compensation by fixed equalizers, the eye height is degraded due to intersymbol interference for line lengths at points other than the line length at the most preferable point and hence the transmission quality (error rate) is lowered. If the line is short or in the overequalized region, the line loss is small, so that the input signal amplitude is large and the equalized signal amplitude is large with eye height degradation due to intersymbol interference being small (FIG. 2A). On the other hand, if the line is long or in an insufficiently equalized region, the line loss is large (especially, the line loss of high frequency components is very large), so that the input signal amplitude is small and the eye height degradation due to intersymbol interference so increases that the equalizer cannot sufficiently compensate for high-frequency components and the waveform becomes blunt (FIG. 2B). Unless the eye pattern is opened sufficiently, the S/N ratio (the signal-to-noise ratio) is deteriorated. Therefore, in order to prevent eye height degradation for transmission lines having lengths larger than the line length at the most preferable equalization point, it is necessary to set the most preferable point such that the corresponding line length is large. However, in that case, the jitter for line lengths in a certain range smaller than the line length at the most preferable equalization point is increased as shown in the type b in FIG. 1.

It may be conceivable that several fixed equalizers different in the equalizing characteristic are prepared and an equalizer satisfying a repeat length of transmission path is selected for use. However, in an actual transmission system, a signal may or may not pass a repeater to vary the line length and therefore, such concept would not be practical.

Generally, the elastic buffer size E and the number N of times of repeating (the number of repeaters) are determined according to system specifications. Then, an allowable jitter amount $|\phi_{max}|$ per repeating (repeater or node) is necessarily determined. Therefore, in order to realize the allowable jitter amount, an increase in the repeat length of transmission path (line length) is limited.

As described above, according to the prior art, the jitter compensation per repeater is determined solely by the transfer function of the equalizer provided in the repeater, the jitter compensation in a network system was not satisfactorily applicable to other network systems in which the repeat length of transmission paths are different among nodes connected to a transmission line.

SUMMARY OF THE INVENTION

One object of the present invention is to provide a repeater capable of repeating a digital signal without increasing jitter per repeater more than a predetermined allowable jitter amount, irrespective of the repeat length of the transmission path between neighboring nodes.

Another object of the present invention is to provide a repeater having jitter compensation functions such that jitter experienced with transmission of signal portions in a long period repetitive pattern of a pulse signal in a multi-frequency code such as the CMI (Coded Marked Inversion) code or the differential Manchester code can be suppressed and/or the jitter amount is limited to below an allowable value depending on the repeat length of the transmission path.

Another object of the present invention is to provide a PLL circuit suitable for the constitution of the repeaters of the type described above.

According to one aspect of the present invention, in a PLL circuit for receiving a multi-frequency input digital signal (e.g., a two-frequency code signal such as a differential Manchester code signal) from a transmission line and generating a clock signal synchronized with the input signal with a phase offset thereto, means is provided for varying the phase offset depending on the burst pattern of or the frequency of the input signal, thereby compensating jitter caused between signal portions in patterns of different frequencies of the multi-frequency input signal (e.g., between a "0" bit burst pattern and a "1" bit burst pattern).

According to another aspect of the present invention, a repeater having a PLL circuit includes means for detecting a repeat length of transmission path (the length of the transmission line between the upstream neighboring node or repeater and the repeater under consideration) from an input signal received from the transmission line and varying the phase offset depending on the detected repeat length. Thereby, jitter compensation is effected depending on the repeat length of transmission path.

According to another aspect of the present invention, a PLL circuit for generating an AC output signal synchronized with an AC input signal, for example, a two-frequency AC input signal with a phase offset thereto, includes charge storage means and a charge pump circuit for charging and discharging the charge storage means. The charge pump circuit includes first and second current source means for supplying electric currents for charging and discharging the charge storage means in response to a phase difference between the AC input signal and the AC output signal with a period associated with the frequency of the AC input signal and a third current source means for supplying an electric current flowing in a direction concurrent with the electric current from one of the first and second current source means, the third current source means being responsive to the frequency of the AC input signal and being independent of the phase difference. The currents from these current source means are combined to provide a control signal for controlling the phase of the AC output signal.

The current from the third current source means has an average current value or the amount of charge storage in one period varying depending on burst patterns having different frequencies (e.g., depending on whether the signal is in an all-"0" pattern or in an all-"1" pattern), though having an identical absolute current value for both of the patterns, whereby the PLL circuit generates an AC output (a clock signal) which has been compensated for the jitter caused between the signal patterns of the input signal.

When the PLL circuit is employed in a repeater which includes means for detecting the line length or the repeat length of transmission path, use is made of current sources producing currents of different polarity and value and independent of the phase difference between the AC input signal to and the AC output signal of the PLL circuit. A current of a desired magnitude and polarity is selected in accordance with the detected line length and is combined with a current corresponding to the phase difference to thereby obtain a clock signal only containing suppressed jitter irrespective of the line length.

In one embodiment of the present invention, the PLL circuit in the repeater generates an AC output signal or a clock signal synchronized with a multi-frequency AC input signal from the transmission line to the PLL circuit with a phase offset with respect to the input signal, the phase offset varying depending on the frequency, i.e., the signal pattern of signal portions of the input signal. The phase offset should have a polarity and magnitude for compensating the jitter between the signal patterns of different frequencies in the multi-frequency AC input signal. For example, if a signal portion in an all-ones pattern lags in phase behind a signal portion in an all-zeros pattern, the phase offset with which the AC output the clock signal) is generated from the PLL circuit at the time when the all-ones pattern is received is set to a value smaller than that at the time when the all-zeros pattern is received.

In more detail, in order to obtain a clock signal having the phase offset as described above, the PLL circuit has a current source which generates a current independent of synchronization (phase differences) between the AC input and output signals. Namely, a source of adjusting current is specifically provided in a charge pump circuit in the PLL circuit which includes a phase comparator, the charge pump having charging and discharging current sources arranged to perform charging and discharging operations in association with the frequency (the period) of the AC input signal, a loop filter and a voltage-controlled oscillator. The adjusting current source generates an adjusting current concurrent with the current from one of the charging and discharging current sources. When the input signal includes all-zeros and all-ones pattern signal portions, the input signal period varies depending on the signal pattern (if the period of the input signal for an all-zeros pattern is T, the period of the input signal changes to 2T for an all-ones pattern). Therefore, the effect of the adjusting current (average current value) differs depending on the signal pattern (the signal frequency), and pattern dependency of the phase offset is attained. Thus, by the use of an adjusting current source arranged such that the phase offset for an all-ones pattern is larger (smaller) than that for an all-zeros pattern with a repeat length of transmission path causing jitter of negative (or positive) polarity, it is possible to adjust the compensation function of the PLL circuit. Accordingly, with a repeater including such a PLL circuit as mentioned above, it is possible to improve the jitter compensation characteristics of the repeater without changing the most preferable equalization point determined by an equalizer included in the repeater.

In one of the main features of an embodiment of the present invention, since the PLL circuit of the repeater has a structure such that a clock signal is produced having a phase offset varied so as to compensate jitter between signal patterns of an input signal depending on the pattern (the frequency) of the input signal, the PLL circuit is adapted for repeaters with various repeat lengths of transmission path, effectively compensating jitter.

In another feature of an embodiment of the present invention, since the charge pump circuit in the PLL circuit has a source of adjusting current the current of which is controlled so that any jitter compensation characteristic can be attained as needed, a jitter compensation characteristic suitable for any line length for repeaters having various repeat lengths of transmission path can be obtained easily in a simple structure and therefore the repeat length of transmission path can be increased in a multi-repeater system.

In addition, advantageously, when use is made of a detector for a repeat length of transmission path, a jitter compensation characteristic suitable for that repeat length of transmission path is automatically obtained.

In another feature of an embodiment of the present invention, since a signal transmission network system can reduce jitter produced in one repeater, the size or capacity of the elastic buffer to be provided in a repeater can be reduced when the repeat length of transmission path and the number of repeaters are fixed. On the other hand, when the buffer capacity is fixed, the repeat length of transmission path and the number of repeaters can be increased in the network system.

BRIEF DESCRIPTION OF THE DRAWINGS

FIGS. 7A and 7B are operational waveform diagrams of the PLL circuit of FIG. 6.

DESCRIPTION OF THE PREFERRED EMBODIMENTS

Figure 1:
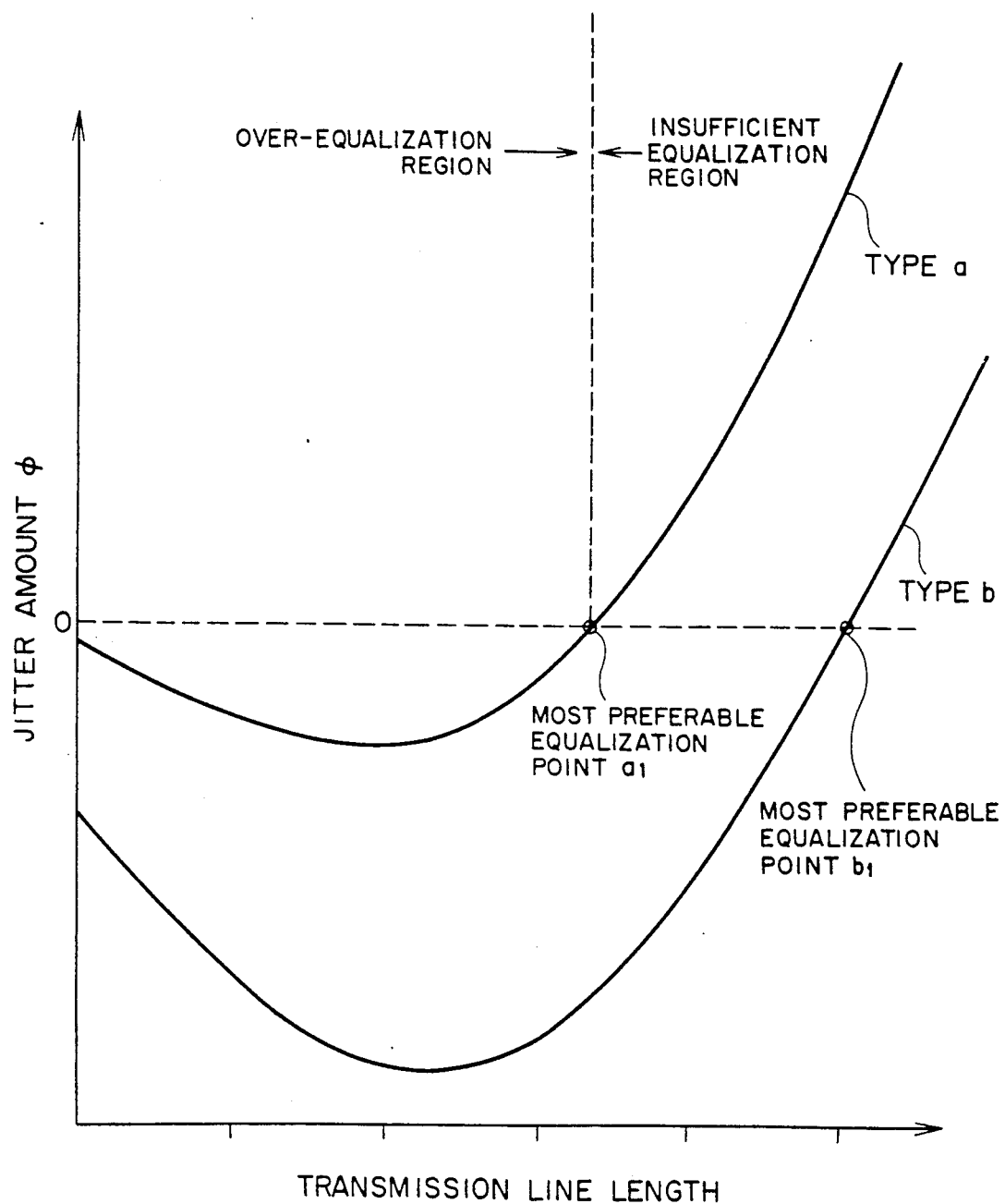
FIG. 1 shows jitter compensation characteristics of a conventional repeater.
Figure 2A:
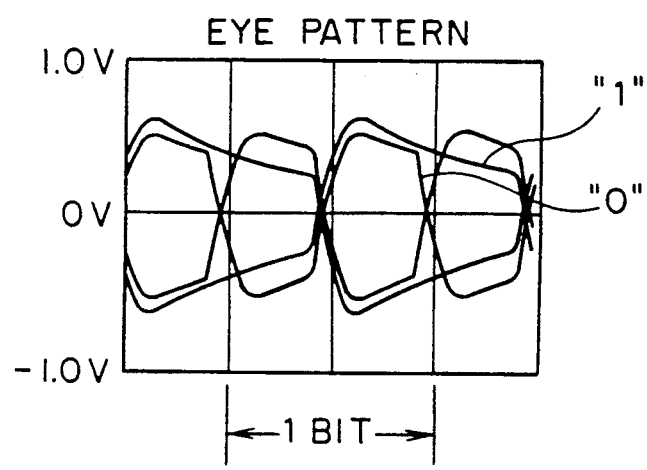
FIGS. 2A and 2B are characteristic waveform diagrams in a general fixed equalizer.
Figure 2B:
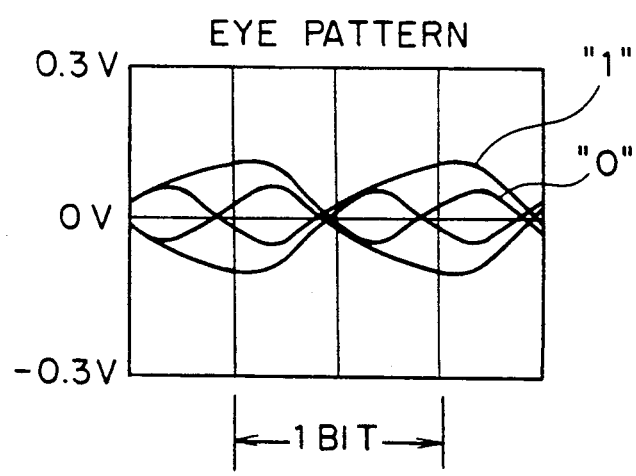
Figure 3:
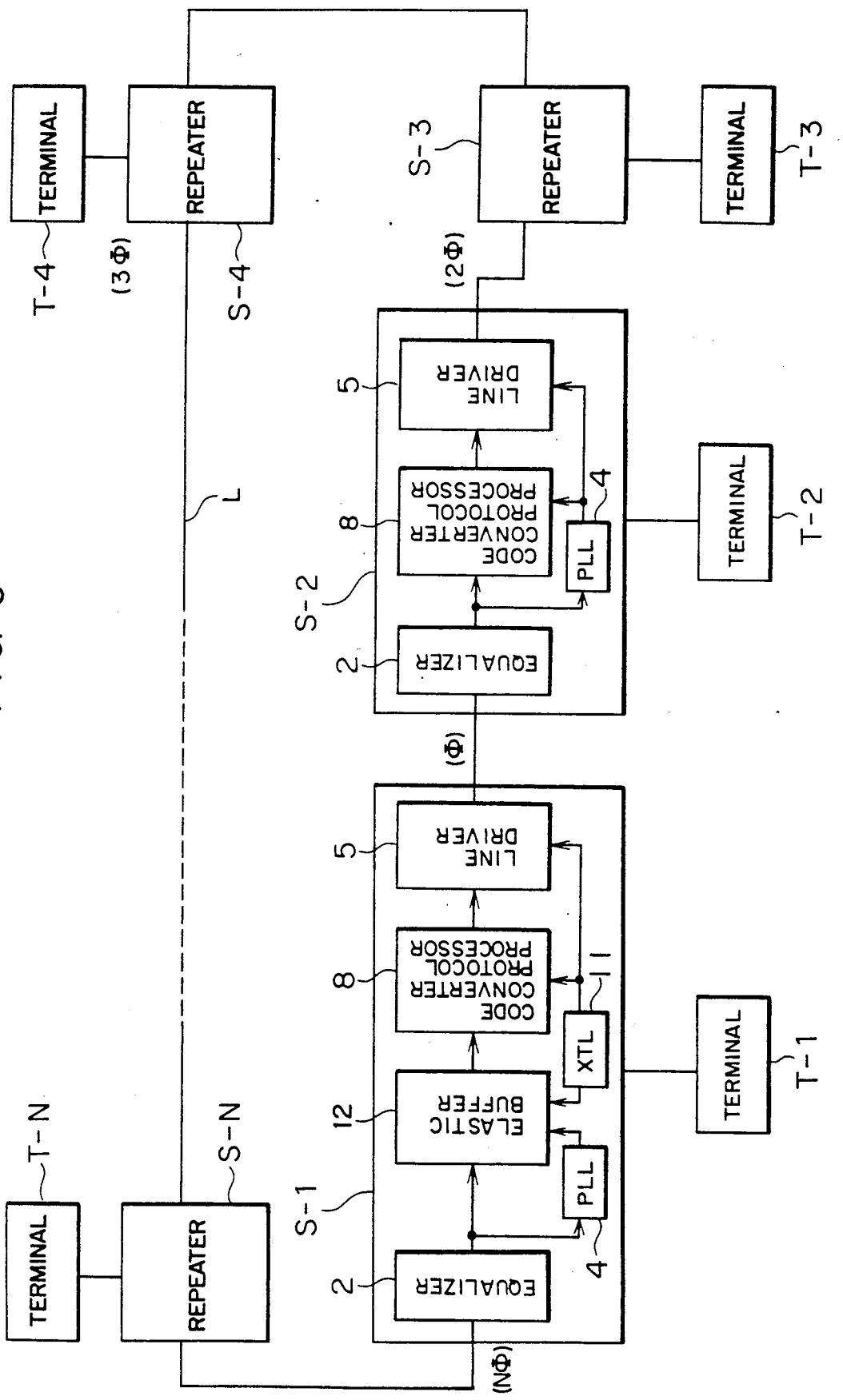
FIG. 3 schematically illustrates a signal transmission network system (token ring LAN) to which the present invention is applicable.
Figure 4:
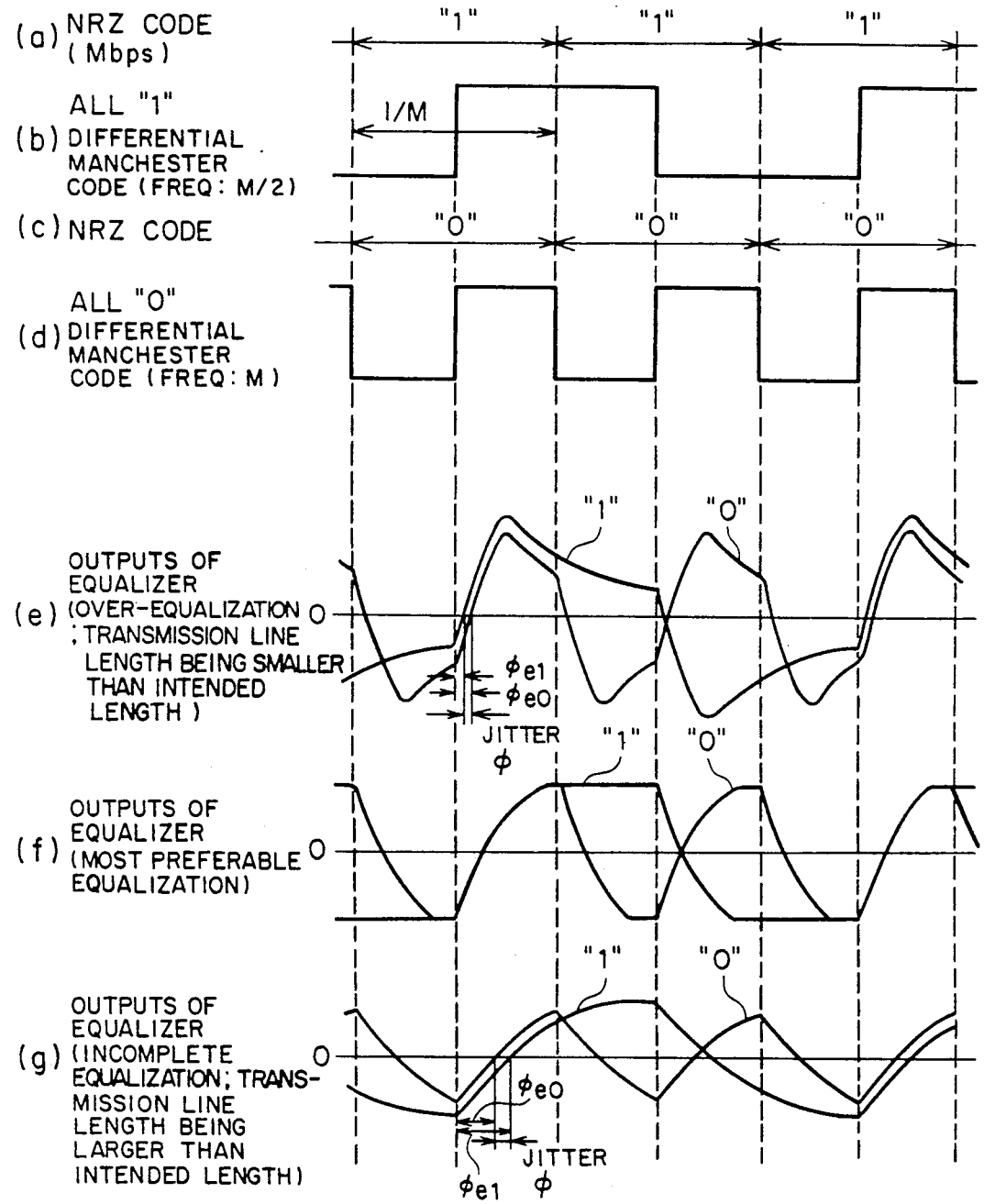
FIG. 4 illustrates a differential Manchester code and jitter.
Figure 5:
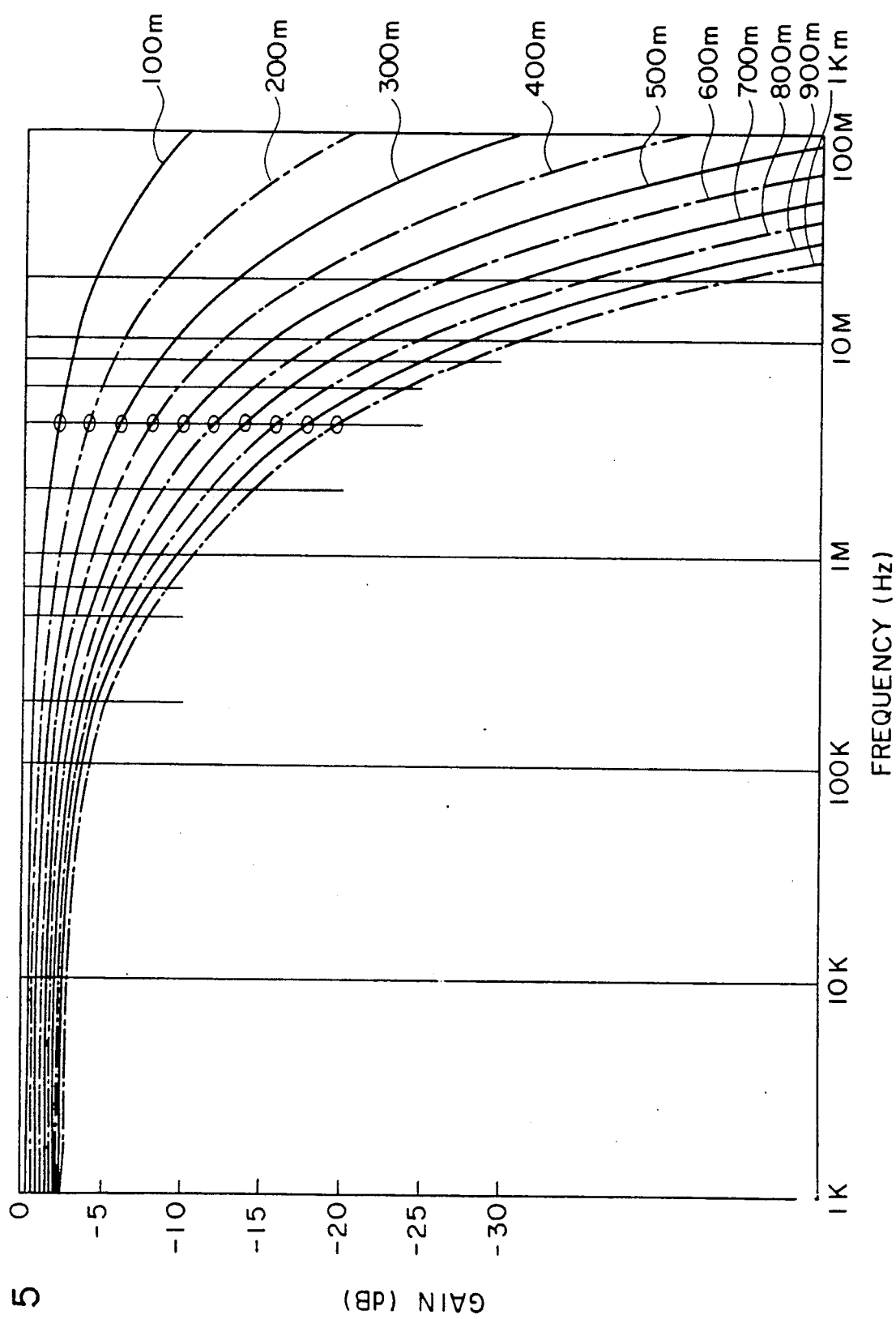
FIG. 5 illustrates transmission line characteristics.

Referring to FIGS. 3–5, a signal transmission network system to which the present invention is applicable and jitter produced in the system will now be described. In a multi-repeater system (a signal transmission network system) such as represented by a token ring LAN shown in FIG. 3, the repeater in each of a plurality of stations (nodes) connected to a transmission line receives from the repeater of an upstream neighboring station a signal distorted as a result of transmission over the transmission line, performs various processes including waveform equalization, timing signal extraction and fault removal such as error check, etc., and transmits the resulting signal to a downstream neighboring repeater, so that downstream repeaters perform such operations to transfer data sequentially.

Referring to FIG. 3, the system includes one active monitor station (hereinafter referred to as "AM") or master station including a repeater S-1 connected to a transmission line L and a terminal T-1 and a plurality of standby monitor stations (hereinafter referred to as "SB") or slave stations each including a repeater S-2, S-3, --- or S-N connected to the transmission line L and a terminal T-2, T-3, --- or T-N. The transmission rate M (baud rate) is determined by a clock source 11 in the AM (for example, a crystal oscillator) so that each SB generates by the use of, for example, a PLL (Phase Locked Loop) circuit 4 a clock signal synchronized with a signal or data transmitted with a timing clock corresponding to the transmission rate and performs a repeating operation with the so generated clock signal. Therefore, the system operates with only one frequency, namely, with the clock frequency of the AM. Each standby station SB S-2, S-3, --- or S-N has a structure identical with the active monitor station AM S-1 so that the former can serve as an active monitor station as the case demands. In FIG. 3, however, each SB is shown as having function blocks as a standby monitor station only.

In such multi-repeater system, occurrence of an error due to accumulation of jitters generated in the respective repeaters may be a serious problem. For example, for transmission of initialized data, namely, long periods of repetition of identical patterns, such as all-zero and all-one patterns, which are often generated, for example, in a computer network, low frequency jitter is generated in the respective repeaters, and the generated jitter is accumulated substantially in proportion to the number of repeaters to thereby cause a reception error in the AM in the system.

A token ring LAN according to The IEEE 802.5LAN Standard uses a differential Manchester code shown in FIG. 4, $(a)-(c)$ for a transmission of a signal or data. With the differential Manchester code, a signal portion in an all-zero pattern has a frequency M and a signal portion in an all-one pattern has a frequency M/2. On the other hand, the PLL circuit 4 operates at a frequency 2M so that it can recognize a change in the signal level within one time slot (the period $=1/M$). The transmission line L has a so-called $\sqrt{f}$ characteristic in which the gain of the transmission line changes in accordance with frequency as shown in FIG. 5. The gain varies greatly depending on line length l as well. The repeater S-1, S-2, --- or S-N of each of the stations has an equalizer 2 for compensating for the line characteristic. However, the compensation characteristic of the equalizer in each repeater is fixed, so that complete compensation for the line characteristic for any line length and frequency is impossible with the fixed equalizer. As a result, as shown in FIG. 4, $(e)-(g)$, a deviation (jitter) of $\phi(\phi_{e0}-\phi_{e1})$ occurs between the time when the equalizer output rises (or falls) for a signal portion in an all-zero pattern of an input signal to the PLL circuit and the time when the equalizer output rises (or falls) for a signal portion in an all-ones pattern of the input signal, and the amount and polarity of the jitter vary depending on the line length. As mentioned above, the jitter $\phi$ generated by a change of the input signal from an all-zero pattern signal portion to an all-one pattern signal portion includes a low frequency component, so that the PLL circuit of each repeater operates to follow the jitter $\phi$. Now, each SB transmits and receives a signal in accordance with the synchronous operation of the PLL circuit with a result that a jitter amount of $\phi$ is caused. Since jitter $\phi$ is produced in each repeater, an amount of jitter of substantially $N \times \phi$ will be generated for the signal transmission timing at the AM reception point. Therefore, in order to compensate (absorb) the jitter of $N \times \phi$, the repeater in the station acting as the AM requires an elastic buffer 12. As N and/or $\phi$ increases, the AM requires a buffer of larger capacity. In the token ring LAN, when the AM becomes defective, another station becomes a new AM instead. Therefore, each SB has a structure to function as an AM described above and, as a result, all the repeaters are required to have a buffer of large capacity.

Figure 6:
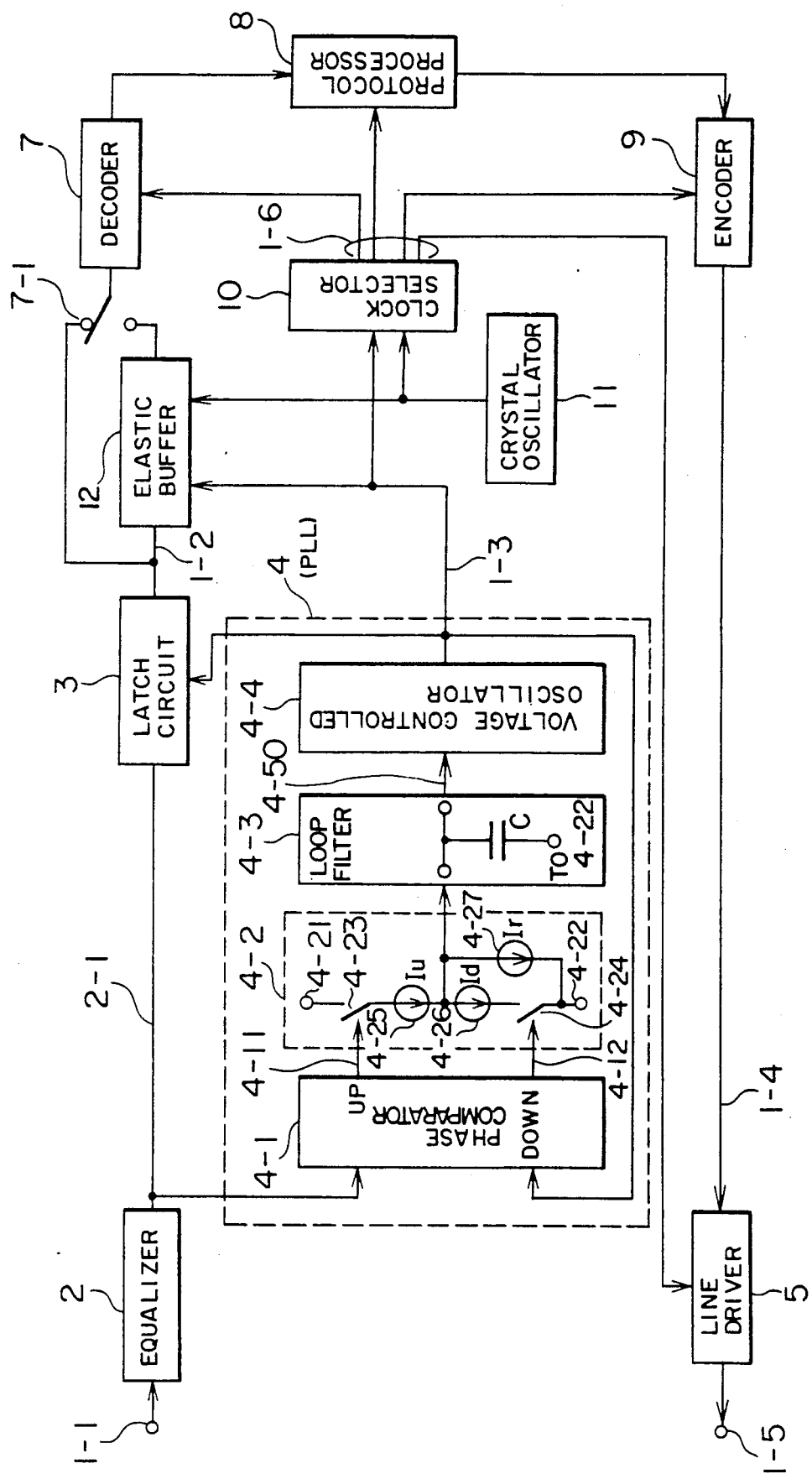
FIG. 6 is a block diagram of a repeater according to one embodiment of the present invention.
Figure 7B:
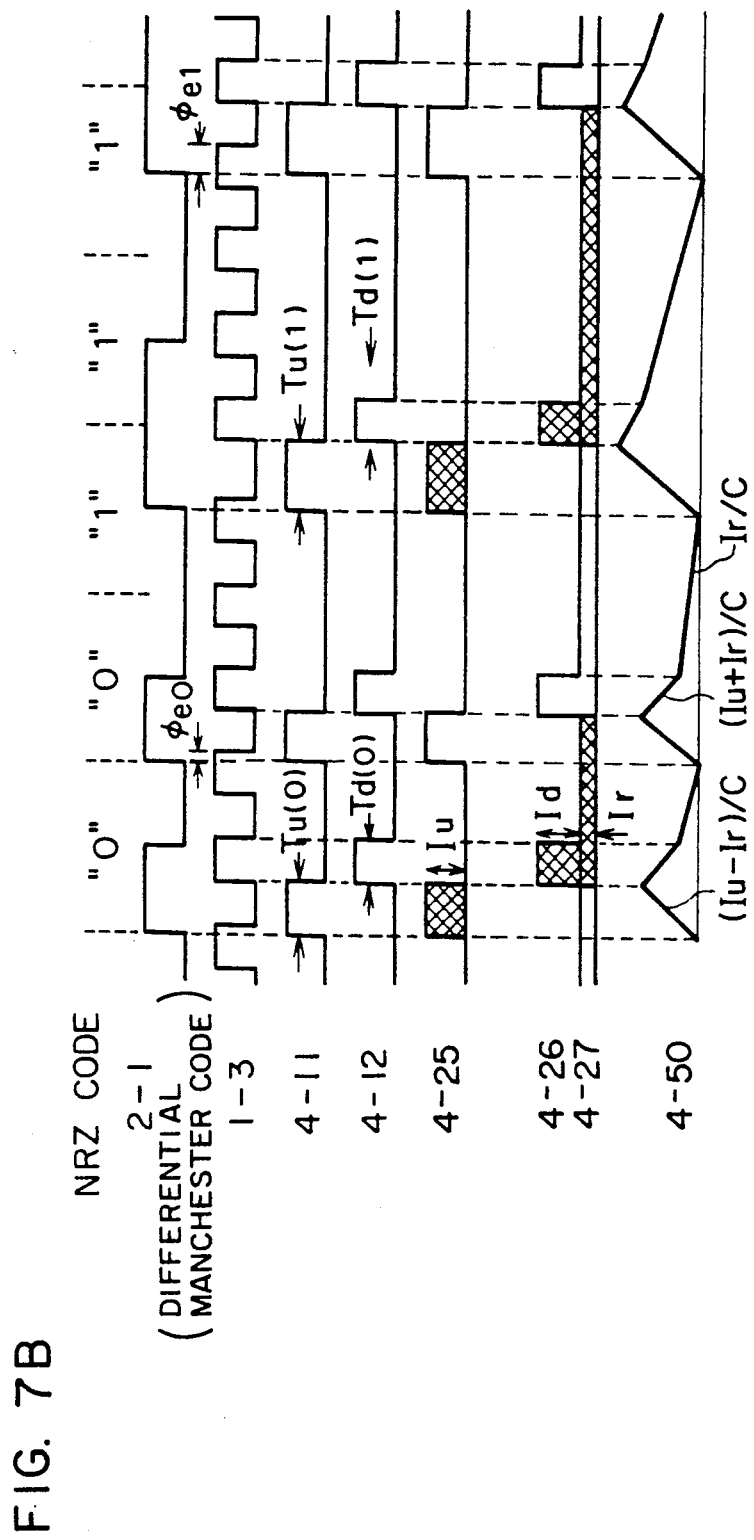
Figure 8:
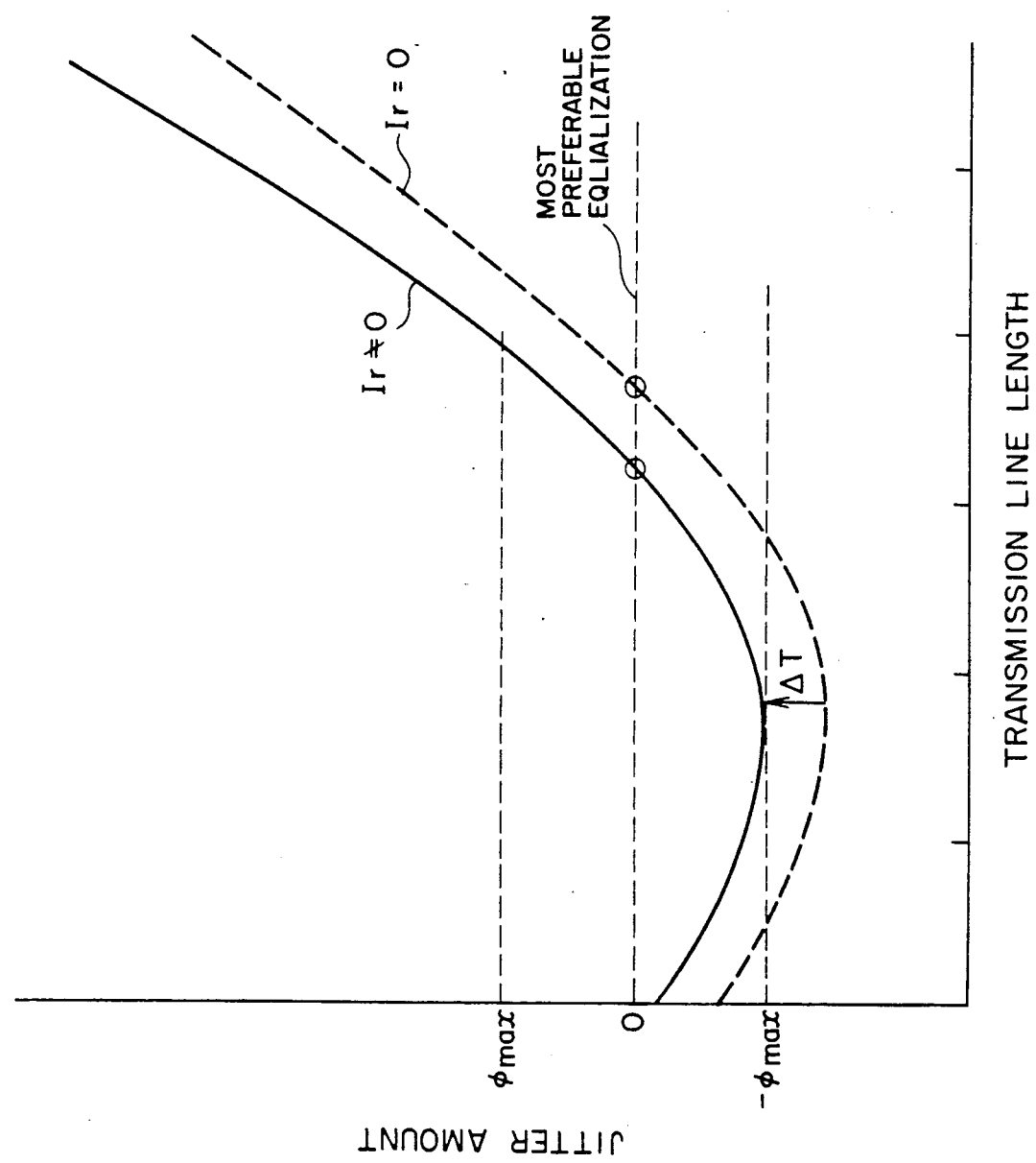
FIG. 8 shows jitter compensation characteristics of one embodiment of the present invention.

Referring to FIGS. 6-8, the structure and operation of those portions of a repeater of any monitor station of the system shown in FIG. 3 which are responsible for waveform shaping, timing signal extraction and transmission or re-sending of a signal to the transmission line, to which portions the present invention is mainly related will be described.

Referring to FIG. 6, reference numeral 1-1 denotes an input terminal for receiving a signal from the preceding or upstream line; 2 represents an equalizer for equalizing the input signal; 3 designates a latch circuit; 4 represents a PLL circuit for generating a clock signal synchronized with the output of the equalizer 2; 3, 7, 8, 10 and 11 designate elements of a regenerator circuit, and 5 represents a line driver for constituting, along with encoder 9 and clock selector 10, a transmitter. The PLL circuit 4 includes a phase comparator 4-1, a charge pump circuit 4-2, a loop filter 4-3 and a voltage-controlled oscillator 4-4. Numeral 1-3 denotes a clock output line, and 1-5 an output terminal to the next or downstream line. The output from the latch circuit 3 is delivered downstream as a Manchester code signal 1-4 through line 1-2, a decoder 7, a protocol processor 8, an encoder 9, and then through a line driver 5.

The signal received from the upstream preceding line (input to the terminal 1-1) is converted by the equalizer 2 to a digital signal of an equalized waveform, and then inputted to the latch circuit 3 and PLL circuit 4. As shown in FIGS. 7A and 7B, the PLL circuit 4 generates a retiming clock (from terminal 1 - 3) synchronous with the output signal 2-1 from the equalizer 2. The latch circuit 3 latches the equalizer output 2-1, for example, in time with the fall of the PLL circuit output clock 1-3, and delivers that signal as a reception signal 1-2 to the next stage processor (for example, a decoder 7). The signal at line 1-2 is here assumed to be a differential Manchester code signal. Reference numeral 1 - 4 denotes the output (Manchester code) of the encoder 9 and which is a digital signal output synchronous with PLL circuit clock 1-3. The signal 1-4 is outputted as a transmission signal through a driver 5 to the terminal 1 - 5.

PLL circuit 4 in this embodiment includes the phase detector 4-1, charge pump circuit 4-2, loop filter 4-3 and voltage-controlled oscillator (hereinafter referred to as "VCO") 4-4. The phase comparator 4-1 compares the phases of the equalizer output 2-1 and the VCO output 1-3 to generate, with a period associated with the frequency of the equalizer output, an UP signal 4-11 and a DOWN signal 4-12 of a pulse width corresponding to the phase difference $\theta_e$. For example, in FIG. 7A, the UP signal may have a waveform such that it changes to a high level when the equalizer output 2-1 rises and maintains the high level until the VCO output 1-3 rises. The DOWN signal may have waveform such that it assumes a high level only when the interval from the time when the UP signal changes to a low level to the time when the VCO output 1-3 changes to a high level. When the equalizer output 2-1 and VCO output 1-3 coincide in phase (when a rise in the output 2-1 and a fall in the output 1-3 coincide), the UP signal 4-11 and DOWN signal 4-12 are equal to each other in pulse width, while when they differ in phase, the pulse widths differ. Assuming that the transmission rate is represented by Mbps (T=1/M), an input signal frequency $f_{r0}$ for the input signal 1-1 in an all-zero pattern will be M, and an input signal frequency $f_{r1}$ for the input signal 1-1 in an all-one pattern will be M/2, while the output frequency $f_{vco}$ of the VCO 4-4 will be 2M. In the charge pump circuit 4-2, when the UP signal 4-11 delivered from the phase comparator 4-1 is high, the switch 4-23 is turned on and the UP current, namely, the charge pump current 4-25 (of a current value of Iu) is injected into the loop filter 4-3 having charge storage means. Conversely, when the DOWN signal 4-12 delivered from the phase comparator 4-1 is high, switch 4-24 is turned on and the DOWN current, namely, the discharge current 4-26 (of a current value of Id) is extracted from the loop filter. Loop filter 4-3 converts the charge pump current to an analog voltage to control the oscillating frequency $f_{vco}$ of the VCO 4-4. Assuming that the high level durations of the UP and DOWN signals are Iu and Td, respectively, the PLL circuit operates so as to satisfy the following equation $$Iu.Tu = Id.Td \quad (4)$$

when the adjusting current 4-27 (of a current value of Ir)=0, as shown in FIG. 7A. In the above state, the PLL circuit operates in the same manner, irrespective of whether the input signal is in an all-zero pattern or in an all-one pattern. Thus, the PLL circuit generates a stable clock signal with a constant phase offset $\phi e$ given by $$\phi e = Tu - Td = \left(\frac{Id}{Iu} - 1\right)Td \quad (5)$$

Therefore, if a signal portion in an all-one pattern lags (or leads) in phase behind (ahead of) a signal portion in an all-zero pattern, the phase of the clock signal lags (leads) correspondingly, keeping the phase offset $\phi e$ constant. When, for example, the loop filter 4-3 is constituted by a single capacitor (with capacitance C) as shown in FIG. 6 for simplicity sake, the output voltage waveform of the loop filter will be as shown in FIG. 7A as 4-50. The gradients of the slopes for the charging and discharging of the capacitor will be $I_u/C$ and $I_r/C$, respectively. On the other hand, as shown in FIG. 7B, if Ir is not equal to 0, the operation of the PLL circuit differs depending on the signal pattern.

If the signal is in an all-zero pattern, the PLL circuit performs a phase-locked operation with intervals of T (the bit period), so that it operates so as to satisfy the following equation $$I_u T_{u(0)} = I_d T_{d(0)} + I_r T \quad (6)$$

where $T_{u(0)}$ and $T_{d(0)}$ are durations Tu and Td, respectively, for an all-zero pattern input signal. At this time, the phase offset $\phi_{e0}$ is given by $$\phi_{e(0)} = T_{u(0)} - T_{d(0)} = (Id/Iu-1)T_{d(0)} + (Ir/Iu)T \quad (7)$$

On the other hand, in the case of an all-one pattern signal, the PLL circuit performs a phase-locked operation with intervals of 2T, so that $$I_u \cdot T_{u(1)} = I_d \cdot T_{d(1)} + 2I_r T \quad (8)$$

where $T_{u(1)}$ and $T_{d(1)}$ are the durations Tu and Td, respectively, for an all-one pattern input signal. The phase offset $\phi_{e1}$ is given by $$\phi_{e1} = T_{u(1)} - T_{d(1)} = (Id/Iu-1)T_{d(1)} + 2(I_r/Iu)T \quad (9)$$

Therefore, as will be seen from the equations (7) and (9), if there is a source of adjusting current, the phase offset changes depending on the pattern or frequency of the input signal in which the time differences $\Delta T$ between $\phi_{e1}$ and $\phi_{e0}$ due to the dependency is given by $$\Delta T = \phi_{e1} = \phi_{e0} = (Id/Iu-1)(T_{d(1)} - T_{d(0)}) + (Ir/Iu)T \quad (10)$$

If Id=Iu,
$$\Delta T = (Ir/Iu)T \quad (11)$$

For example, if the all-one pattern signal portion of the signal 2-1 lags in phase behind the all-zero pattern signal portion of the signal 2-1 by $\Delta T$, that is, if the input signal 2-1 contains jitter, the phase of the clock signal for the all-one pattern leads by $\Delta T$ corresponding substantially to that delay as compared to that of the clock signal for the all-zero pattern, thereby compensating the jitter. In this case the output voltage waveform of the loop filter will be as shown in FIG. 7B as 4-50. The gradients of the slopes for the charging and discharging of the capacitor will be $(I_u - I_r)/C$ and $(I_u + I_r)/C$, $I_r/C$, respectively.

Consequently, as shown in FIG. 8, according to the repeater using this PLL circuit, the compensation characteristic of the repeater is seemingly changed from the dotted line (without the adjusting current source $I_r$) to the solid line, satisfying the equation (2) without changing the most preferable equalization point determined by the equalizer, owing to the provision of the adjusting current source. The value of T is constant in equation (11) because it is defined by the transmission rate. Thus, since $\Delta T$ is determined by a ratio between $I_r$ to $I_u$, it is realized easily with high accuracy even in the form of an LSI device. While in FIG. 6 the adjusting current $I_r$ is provided on the "DOWN" side, it may be provided on the "UP" side if reverse correction or change is desired in FIG. 8. In the latter case, a compensation characteristic is obtained which is shifted downwardly from the dotted line representing Ir=0 in FIG. 8. In this case, the terms containing $I_r$ in equations (6)-(11) have their signs inverted. Further, according to the described embodiment, the repeat length of the transmission path per repeater with allowable jitter amount is about 1.5 times as large as that according to the prior art. The repeat length in the embodiment is at least 1500 m, while it is at most 800 m in the prior art.

Figure 9:
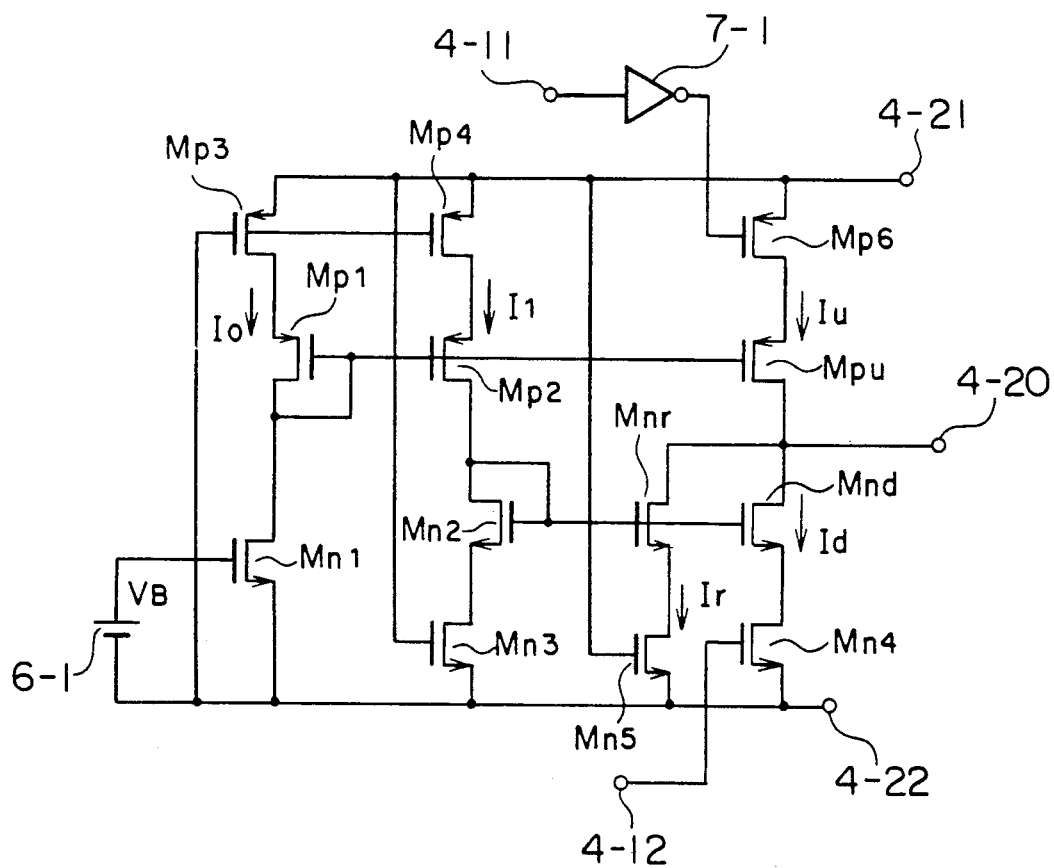
FIG. 9 is a schematic of a charge pump circuit in one embodiment of the present invention.

FIG. 9 illustrates the charge pump circuit using CMOS technology in which reference numeral 6-1 denotes a voltage source having a potential of Vs, 4-21 a positive power source terminal, and 4-22 a negative power source terminal. Assume that an N-channel MOS transistor $M_{n1}$ operates in the saturation region, the flowing current $I_0$ is given by $$I_0 = \frac{1}{2} \mu_n C_{OX} \left(\frac{W}{L}\right)_{n1} (V_B - V_{thn})^2 \tag{12}$$

where $\mu_n$ is the mobility of the N-channel MOS transistor, $C_{OX}$ is the gate oxide capacitance, W is the channel width, L is the channel length, $(W/L)_{n1}$ is the transistor size ratio (the channel width to length ratio), and $V_{thn}$ is the threshold voltage. If the values of currents flowing through transistors $M_{p2}$, $M_{nr}$, $M_{pu}$, $M_{nd}$ are represented by $I_1$, $I_r$, $I_u$ and $I_d$ and if the respective transistor size ratios (W/L) are given a subscript corresponding to the transistor numbers, $M_{p2}$, $M_{pu}$ together constitute a current mirror of $M_{p1}$, and $M_{nd}$ and $M_{nr}$ constitutes a current mirror $M_{n2}$. Therefore, $$I_1 = \frac{\left(\frac{W}{L}\right)_{p2}}{\left(\frac{W}{L}\right)_{p1}} I_0 \tag{13}$$

$$I_r = \frac{\left(\frac{W}{L}\right)_{nr}}{\left(\frac{W}{L}\right)_{n2}} I_1 = \frac{\left(\frac{W}{L}\right)_{nr}\left(\frac{W}{L}\right)_{p2}}{\left(\frac{W}{L}\right)_{n2}\left(\frac{W}{L}\right)_{p1}} I_0$$

$$I_u = \frac{\left(\frac{W}{L}\right)_{pu}}{\left(\frac{W}{L}\right)_{p1}} I_0$$

$$I_d = \frac{\left(\frac{W}{L}\right)_{nd}}{\left(\frac{W}{L}\right)_{n2}} I_1 = \frac{\left(\frac{W}{L}\right)_{nd}\left(\frac{W}{L}\right)_{p2}}{\left(\frac{W}{L}\right)_{n2}\left(\frac{W}{L}\right)_{p1}} I_0$$

The respective current values are determined by the relative ratio of the transistor sizes. Terminals 4-11 and 4-12 are the output terminals of the phase detector and correspond to the output terminals of the UP and DOWN signals. An inverter 7-1 and a P-channel MOS transistor $M_{p6}$ and an N-MOS transistor $M_{n4}$ constitute switches which are turned on when the UP/DOWN signals are at high level and correspond to 4-23 and 4-24 in FIG. 6. Dummy switches $M_{p3}$-$M_{p4}$, $M_{n3}$, $M_{n5}$ absorb fluctuations of $I_u/I_0$, $I_d/I_0$ due to fluctuations of the source potential when switching MOS transistors $M_{p6}$ and $M_{n4}$ are turned on.

As described above, the source of adjusting current is realized easily with high accuracy in the form of an LSI device.

Figure 10:
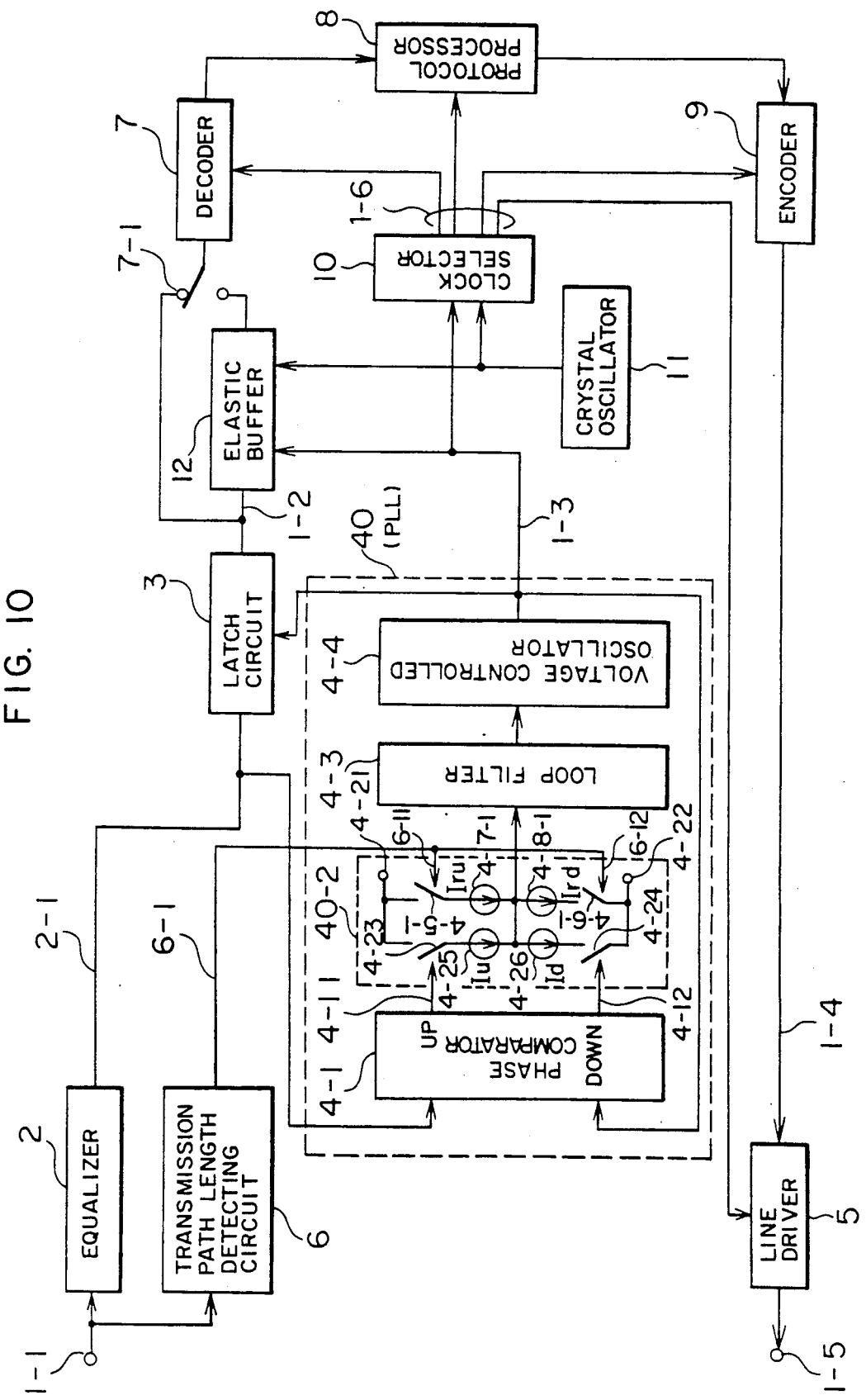
FIG. 10 is a block diagram of a repeater according to another embodiment of the present invention.
Figure 11:
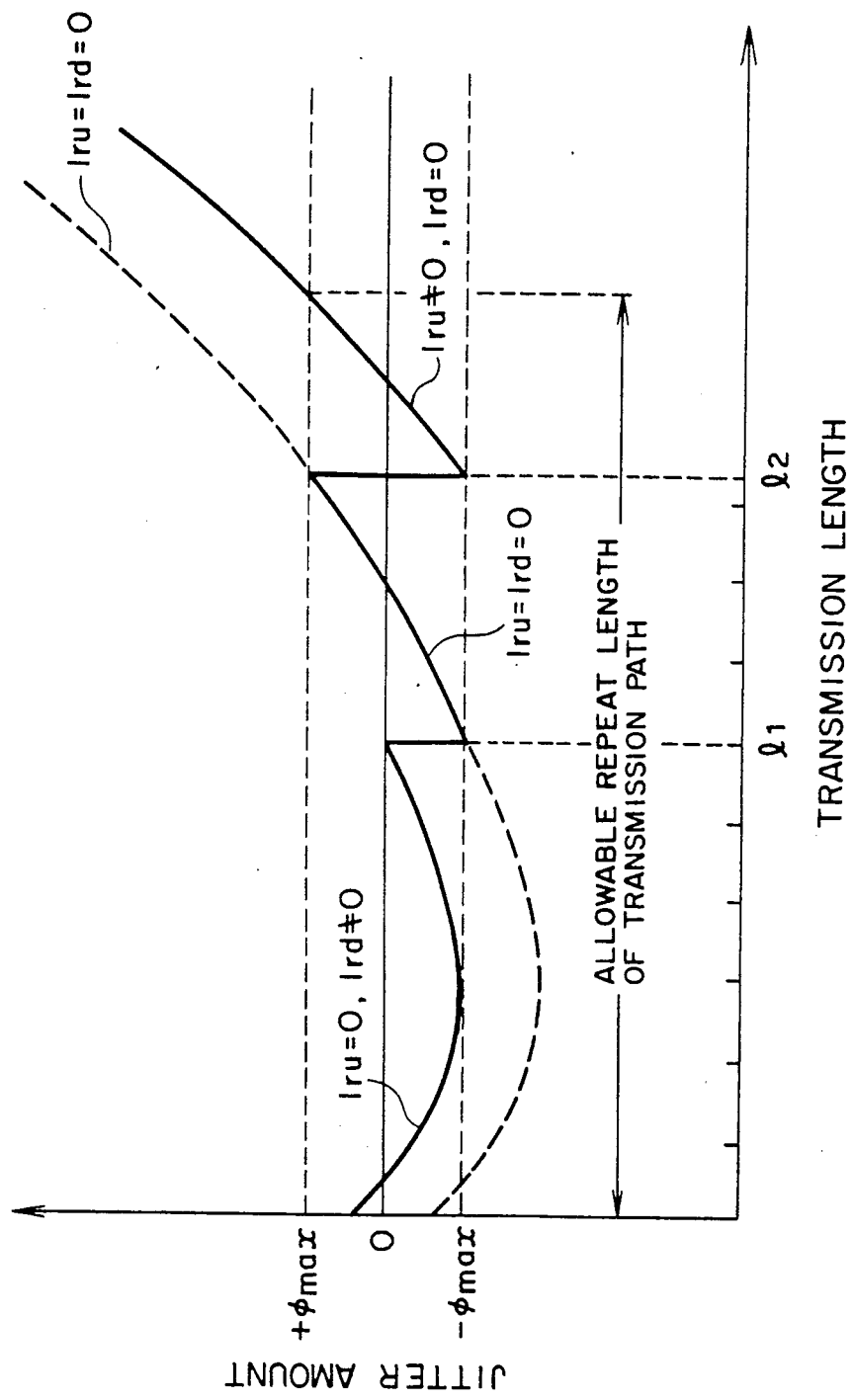
FIG. 11 shows jitter compensation characteristics of the embodiment of FIG. 10.
Figure 12:
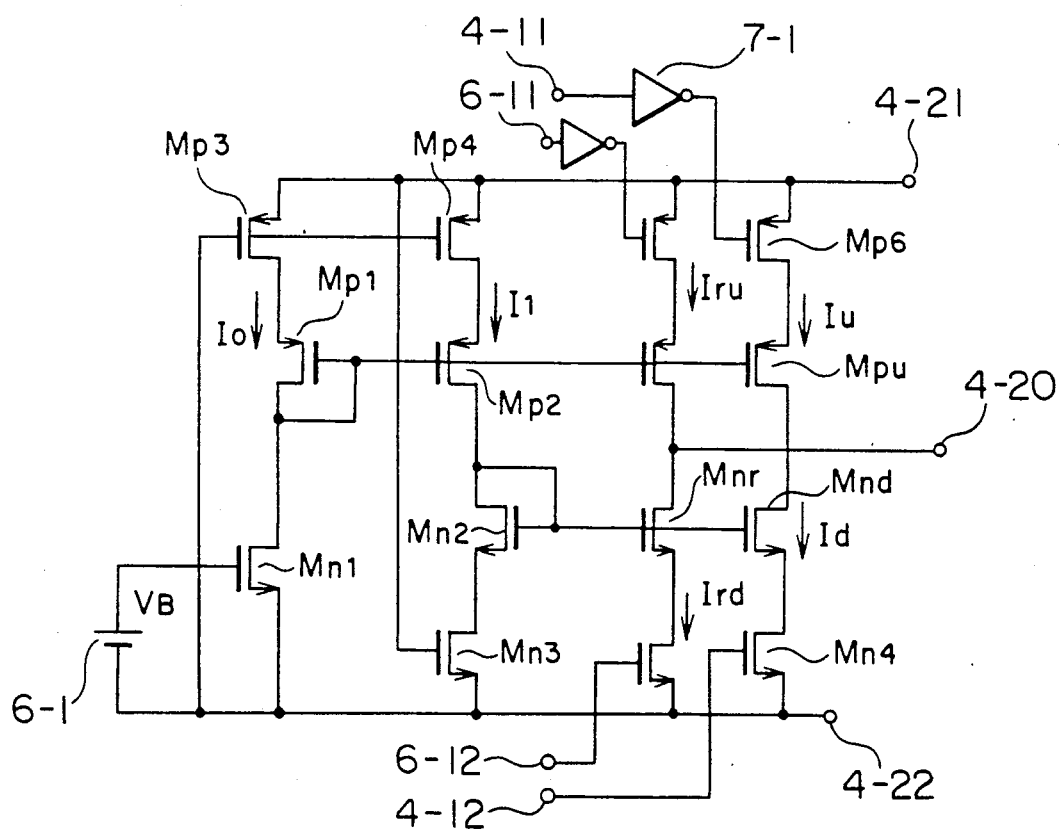
FIG. 12 is a schematic of a charge pump circuit in the embodiment of FIG. 10.
Figure 13:
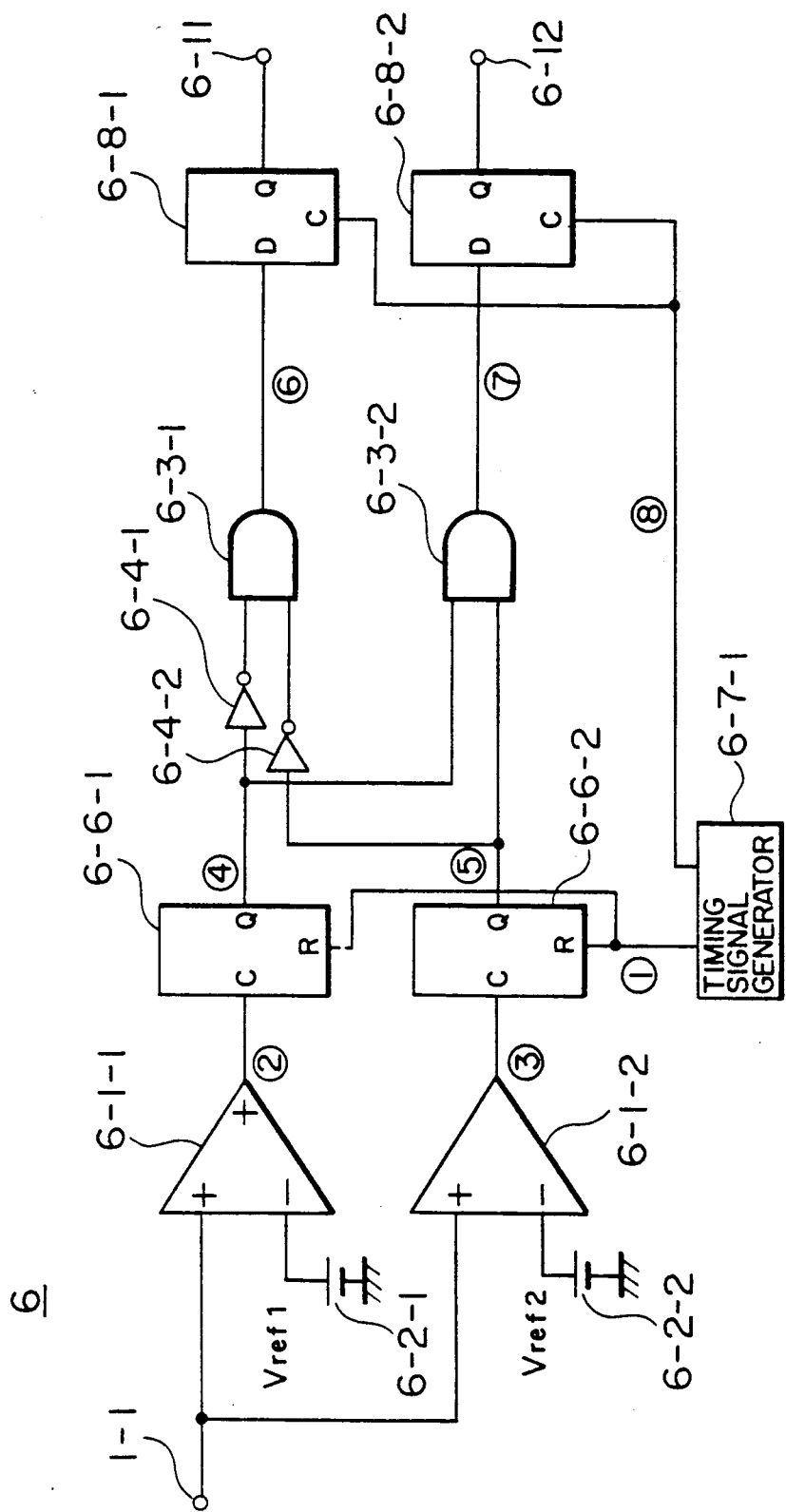
FIG. 13 is an example of a specified circuit diagram of a line length detector employed in the embodiment of FIG. 10.
Figure 14:
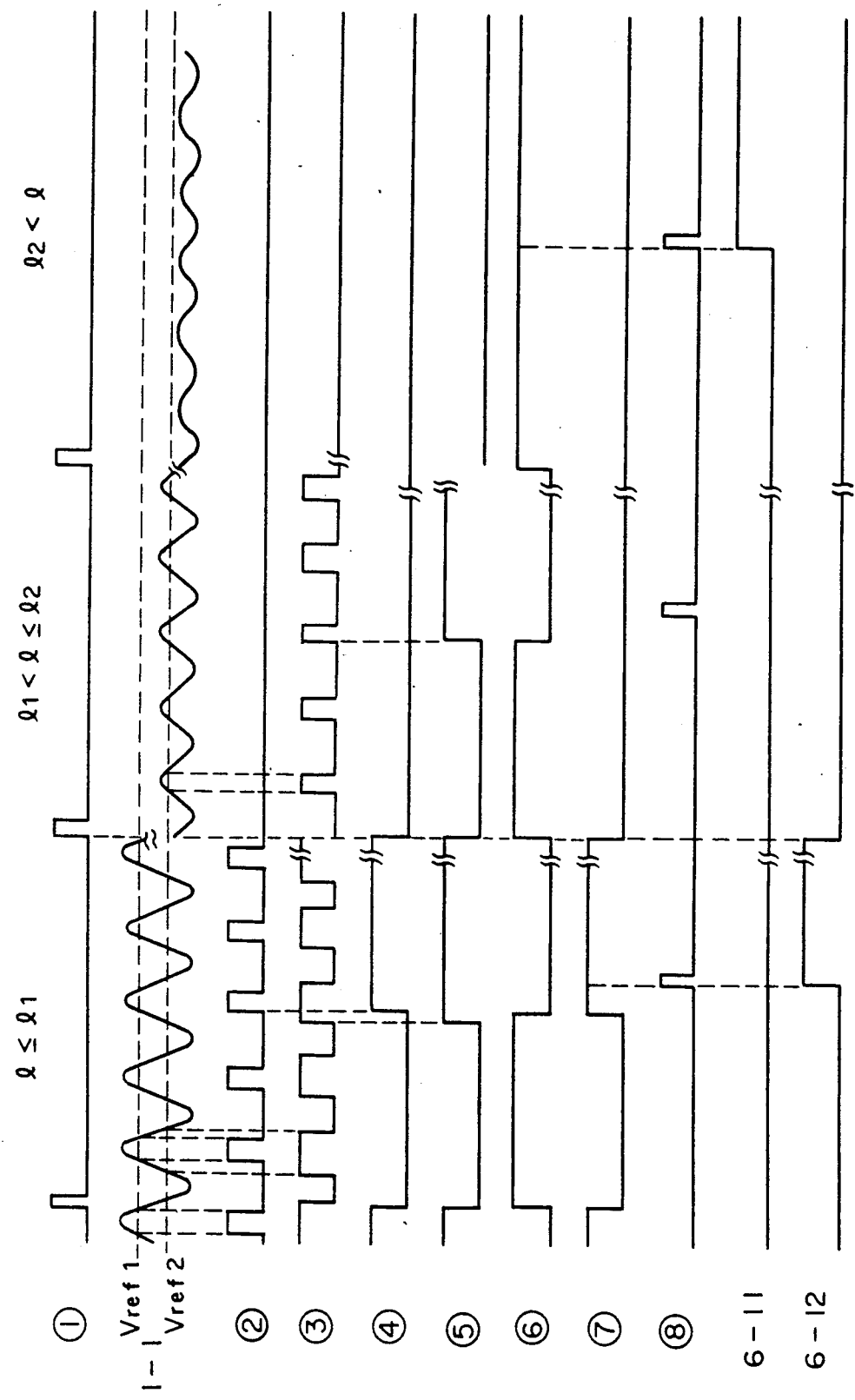
FIG. 14 is a timing chart showing the operation of the detector of FIG. 13.

FIG. 10 shows another embodiment, in which terminals 1-1 to 1-3, blocks 2, 3, 4-1, 4-3, 4-4 and 5 to 11 are similar to those shown in FIG. 6 and further description thereof will be omitted. A block 6 denotes a transmission path length detecting circuit which detects a line length (a repeat length of transmission path) from a signal of the line output 1-1 and produces a compensation control signal 6-1. Charge pump circuit 40-2 includes adjusting current sources 4-7-1 and 4-8-1 which are independently on-off controlled by actuating means constituted by switches 4-5-1 and 4-6-1 in response to the control signal 6-1 of the line length detecting circuit 6. As a result, as shown in FIG. 11, the jitter compensation characteristic of the repeater can be changed in accordance with line length (the repeat length of transmission path), and as a result, the repeat length of transmission path satisfying equation (2) can be increased. The determination/realizing method of $I_{ru}$ and $I_{rd}$ is similar to those described in connection with FIGS. 6 and 9. FIG. 12 shows an example of the structure of the charge pump circuit 40-2 of FIG. 10 using the CMOS technology. On the other hand, the line length detecting circuit 6 can be realized, for example, by the structure as shown in FIG. 13. FIG. 14 shows the signal waveforms at main points of the circuit 6. Assume now that the repeat length of transmission path 1 is detected in three steps, namely, $1 < l_1$, $l_1 < 1 \leq l_2$, $l_2 < 1$.

In FIG. 13, reference numeral 1-1 denotes an input signal from the transmission line, 6-2-1 and 6-2-2 fixed power sources ($V_{ref1} > V_{ref2}$) corresponding to the levels of the amplitudes of the input signal voltage for the line lengths $L_1$ and $L_2$, 6-1-1 and 6-1-2 differential amplifiers constituting a comparator, 6-6-1 and 6-6-2 counters which count up at rising edges of the output signals of the differential amplifiers 6-1-1 and 6-1-2 applied to the respective clock terminals C, stop their counting operation after their count reaches a predetermined value ($\delta$) and output high level (hereinafter referred to as "H") signals to the Q terminals, 6-3-1, 6-3-2 AND gates, 6-4-1, 6-4-2 inverters, 6-8-1, 6-8-2 flip-flop circuits constituting a latch circuit and taking output signals of the AND circuits 6-3-1, 6-3-2 applied to the D-terminals at rising edges of the clock signals applied to the clock terminals C, and 6-7-1 a timing signal generator which generates a reset signal for the counters 6-6-1 and 6-6-2 and a clock signal for the latch circuits 6-8-1, 6-8-2. The operation of the length detecting circuit of FIG. 13 will be described briefly using FIG. 14. For convenience of explanation, assume that $\delta = 3$. If $1 \leq l_1$, the maximum value of the input signal from the transmission line is greater than $V_{ref1}$ and $V_{ref2}$, both of the comparators 6-1-1 and 6-1-2 output pulse signals (②, ',crc/3/ ) with certain periods. Thus, the counters continue to count up and, when the number of pulses is 3 or more, the Q terminals (④, ⑤) are maintained at "H" level. At this time, the AND gate outputs (⑥, ⑦) are "L" and "H", respectively, and latched by a latch clock ⑧ with the clock signals from the timing signal generator 6-7-1, and the phase offset control signals 6-11, 6-12 are maintained at "L" and "H", respectively. By resetting the counters at constant periods and repeating the above operations, the line length is detected at all times. If $l_1 < 1 \leq l_2$, only comparator 6-1-2 outputs a pulse signal, so that counters 6-6-1 and 6-6-2 output "L" and "H", respectively. Thus, the phase offset control signals 6-11, 6-12 become "L" together. If $l_2 < 1$, both comparators 6-1-1 and 6-1-2 do not output a pulse signal, so that both counters 6-6-1 and 6-6-2 output "L".

Therefore, the phase offset control signals 6-11, 6-12 become "H" and "L", respectively. Thus, by controlling switches 4-5-1 and 4-6-1 of FIG. 7 using the phase offset control signal 6-11 and 6-12, respectively. $\Delta T>0$ for $1 \leq l_1$, $\Delta T=0$ for $l_1<1 \leq l_2$, and $AT<0$ for $l_2<1$, and thus the compensation characteristic of FIG. 8 is realized easily.

While, for convenience of explanation, in the particular embodiment, the detection of the line length is performed in three steps, this invention is not limited to this particular embodiment. Further, detection of the line length by the line length detecting circuit is performed with an input signal received from the transmission in the above embodiment, but the detection may be performed with any analog signal obtained from the equalizer 2 of FIG. 7. The polarities of the switches are not limited to the described embodiment.

Figure 15:
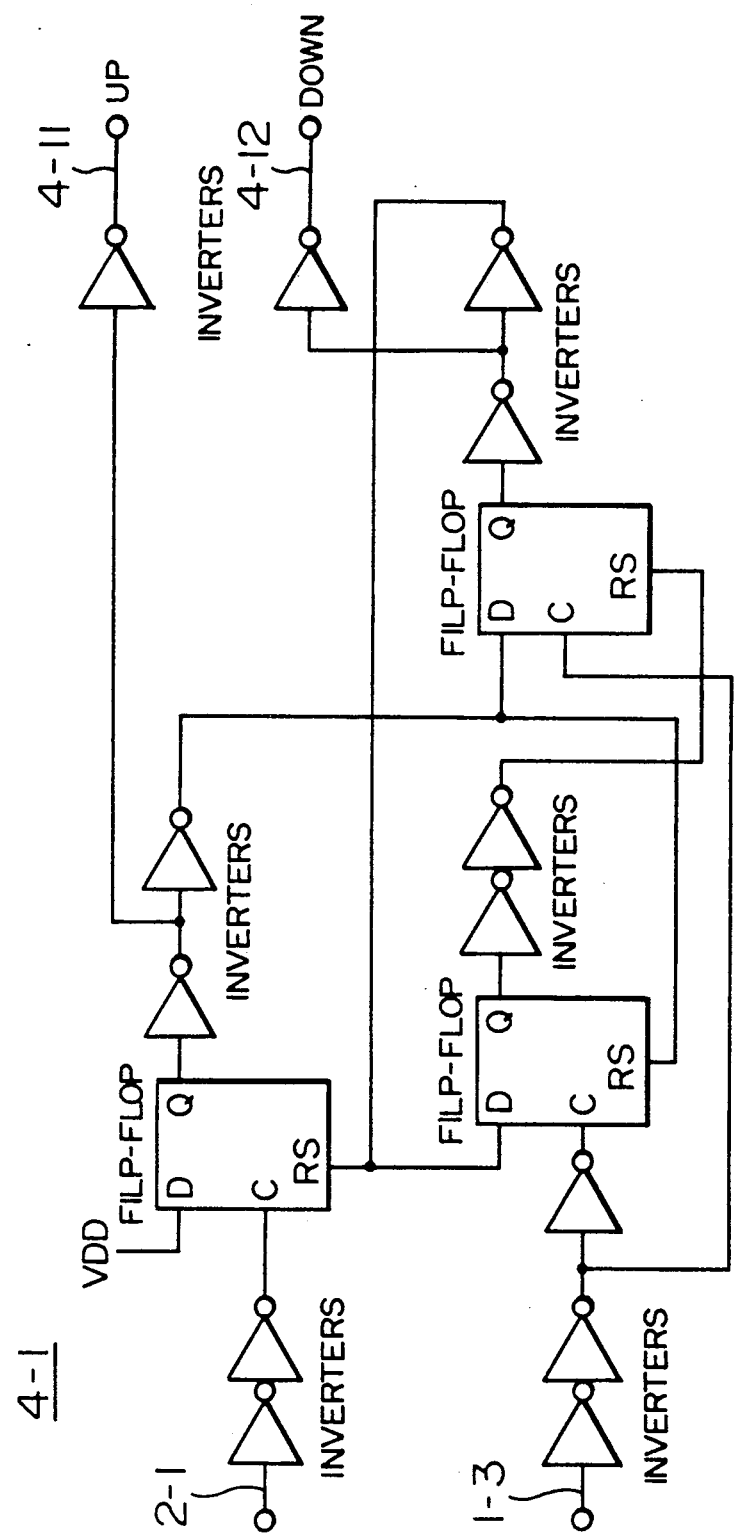
FIG. 15 is an example of a specified circuit diagram of a phase comparator which may be employed in an embodiment of the present invention.

An example of a specified structure of the phase comparator 4-1 employed in FIG. 10 embodiment is shown in FIG. 15.

We claim:

1. A PLL circuit responsive to a multi-frequency AC input signal including at least two signal portions having different frequencies, comprising:
   first means for generating an AC output signal synchronized with said AC input signal, said AC output signal including at least two signal portions having different frequencies corresponding to said signal portions of said AC input signal and having different phase offsets depending on the frequencies of said signal portions in said AC input signal, said different phase offsets constituting jitter in said AC output signal; and
   second means connected with said first means for varying at least one of said phase offsets depending on a frequency of said AC input signal to suppress said jitter.

2. A PLL circuit according to claim 1, in which said second means includes a charge storage and a charge pump circuit, said charge pump circuit having a first current source for supplying an electric current for charging said charge storage, a second current source for extracting an electric current for discharging said charge storage, said first and second current source being controlled so that said charge storage is charge or discharged in response to a phase different between said AC input signal and said AC output signal with a period associated with the frequency of said AC input signal, and a third current source for supplying an electric current flowing in a direction concurrent with the electric current from one of said first and second current sources according to the frequency of said AC input signal and being independent of said phase difference.

3. A PLL circuit according to claim 2, in which said second means includes actuating means for on-off controlling said third current source means in response to an external signal applied to said second.

4. A PLL circuit according to claim 3, in which said charge pump circuit further has a fourth current source for supplying to said charge storage means an electric current flowing in a direction concurrent with the electric current from said one current source, said fourth current source being independent of said phase difference, said third and fourth current sources means being on-off controlled by said actuating means independently from each other thereby to vary said phase offset in response to the frequency of said AC input signal and said external signal.

5. A PLL circuit responsive to a multi-frequency AC input signal thereto for delivering an AC output signal, said AC input signal including at least two signal portions having different frequencies, said AC output signal including at least two signal portions having different frequencies corresponding to said signal portions of said AC input signal and having different phase offsets depending on the frequencies of said signal portions of said AC input signal, said different offset constituting jitter in said AC output signal, the circuit, comprising:
   a controlled oscillator capable of delivering an oscillation signal as said AC output signal of said PLL circuit;
   a comparator having a first input terminal for receiving said AC input signal to said PLL circuit and a second input terminal connected to receive a portion of said oscillation signal from said oscillator and phase-comparing said input signal and said oscillation signal to generate an output signal based on the phase comparison; and
   a control circuit including first means responsive to said output signal of said comparator for generating a first detection signal, second means generating a second detection signal representative of the frequency of said AC input signal, third means for combining said first and second detection signals into a control signal having a magnitude depending on said first and second detection signals, and means for feeding said control signal to said oscillator so that the phase of said oscillation signal delivered from said oscillator is varied depending on said control signal with said phase offset varied depending on the frequency of said AC input signal to suppress said litter.

6. A repeater responsive to a multi-frequency AC input signal including at least two signal portions having different frequencies, comprising:
   means for equalizing said AC input signal and for producing an equalized AC input signal;
   a PLL circuit connected to receive said equalized AC input signal and for generating an AC output signal synchronized with said equalized AC input signal, said AC output signal including at least two signal portions having different frequencies corresponding to said signal portions of said AC input signal and having different phrase offsets depending on the frequencies of said signal portions in said AC input signal, said different phase offsets constituting jitter in said AC output signal, said PLL circuit including means for varying at least one of said phase offsets in said AC output signal depending on a frequency of said equalized AC signal;
   a regenerator circuit, connected to said equalizing means, for regenerating data from said equalized AC signal by the use of said AC output signal of said PLL circuit to suppress said jitter; and
   a transmitter connected to receive an output signal from said regenerator circuit serving to send said output signal form the repeater.

7. A repeater according to claim 6, in which said PLL circuit further includes actuating means for on-off controlling said phase offset varying means in response to an external signal applied to said actuating means.

8. A repeater according to claim 7, further comprising means for detecting, from said input signal to the repeater, the length of a transmission path between the repeater and a neighboring repeater from which said input signal is sent through said transmission path and for producing a compensation control signal, said detecting and producing means being connected with said actuating means so that said compensation control signal is applied to said actuating means for compensating variation of said phase offset by use of the detected transmission path lengths.

9. A signal transmission network system including a signal transmission line and a plurality of nodes coupled to said transmission line, each of said nodes being distanced from an upstream adjacent node by a repeat length of transmission path and having a repeater, wherein said repeater in said each node comprises:

means for equalizing an AC input signal which has traveled said repeat length of transmission path over said transmission line and for producing an equalized AC signal, said AC input signal including at least two signal portions having different frequencies, said equalized AC signal undesirably containing jitter caused by unequal delay of said two signal portions over said repeat length of travel of said transmission line;

a PLL circuit, connected to receive said AC equalized signal, for generating an AC output signal synchronized with said AC equalized signal, said AC output signal including at least two signal portions having different frequencies corresponding to said signal portions of said AC input signal and having different phase offsets depending on the frequencies of said signal portions in said AC input signal, said different phase offsets constituting jitter in said AC output signal, said PLL circuit including means for varying at least one of said phase offsets depending on the frequency of said equalized AC signal to suppress said jitter;

a regenerator circuit connected to said equalizing means for regenerating data from said equalized AC signal by the use of said AC output signal of said PLL circuit; and a transmitter connected to receive an output signal from said regenerator circuit and serving to send said output signal to said transmission line.

10. A local area network system including a signal transmission line and a plurality of monitor stations coupled to said transmission line, each of said stations being distanced from an upstream adjacent station by a repeat length of transmission path and having a repeater, wherein said repeater in each station comprises:

means for equalizing a multi-frequency input signal which has traveled said repeat length of transmission path over said transmission line and for producing an equalized AC signal, said input signal having at least two signal portions of different frequency and said equalized AC signal undesirably containing jitter caused by unequal delay of said two signal portions over said repeat length of travel on said transmission line;

a PLL circuit connected to receive said AC equalized signal and for generating an AC output signal synchronized with said AC equalized signal, said output signal having a phase offset with respect to said AC equalized signal, said PLL circuit including means for varying said phase offset depending on the frequency of said equalized AC signal to suppress said jitter;

a regenerator circuit connected to said equalizing means for regenerating data from said equalized AC signal by the use of said AC output signal of said PLL circuit; and a transmitter connected to receive an output signal from said regenerator circuit and serving to send said output signal to said transmission line.

11. A repeater comprising:

an equalizer for equalizing a multi-frequency AC input signal which includes at least two signal portions having different frequencies received from a transmission line to produce an equalized AC output signal including at least two signal portions having different frequencies corresponding to said signal portions of said AC input signal and having different phase offsets depending on the frequencies of said signal portions in said AC input signal, said different phase offsets constituting jitter in said AC output signal; and a phase-locked loop circuit for generating a clock signal synchronous with the output signal of said equalizer a frequency which varies with at least one of the phase offsets of said multi-frequency AC input signal; and means for compensating for said jitter in the AC output signal of said equalizer using said clock signal.

12. A repeater according to claim 11, further comprising means for detecting a repeat length of transmission path from said multi-frequency AC input signal and for generating a phase offset control signal, said control signal being fed to said clock signal generating means to compensate said jitter in according with the detected repeat length of transmission path.

13. A phase locked loop circuit responsive to a multi-frequency AC input signal including at least two signal portions having different frequencies, comprising:

a voltage-controlled oscillator for generating a clock signal;

a phase detector for receiving said clock signal and said multi-frequency AC input signal to detect a phase difference between those signals, said phase difference representing jitter;

a charge pump circuit for receiving the output of said phase detector; and means for supplying an output from the charge pump circuit to said voltage-controlled oscillator to control the frequency thereof, in which said charge pump circuit includes means for generating a first signal representative of current in accordance with said phase difference and a second signal representative of current independent of said phase difference and means for combining said first and second signals to produce an output for controlling said voltage-controlled oscillator.

14. A phase-locked loop circuit according to claim 13, in which said signal generating means includes current sources for producing, as said second signal, currents different in polarity and value independent of said phase difference, and means for selecting at least one of the current sources in accordance with a repeater length of transmission path between repeaters, current from said at least one selected current source being combined with the current corresponding to said phase difference as said first signal.

15. A phase-locked loop circuit according to claim 13, in which the average current value of the current of said second signal independent of the phase difference depends on the frequency of said multi-frequency AC input signal such that said voltage-controlled socillator generates said clock signal in which jitter between signal portions of different frequencies of said input AC signal is compensated.

* * * * *